United States Patent [19]

O'Dette et al.

[11] 4,348,242

[45] Sep. 7, 1982

[54] ALUMINUM POWDER BLASTING SLURRY SENSITIZER

[75] Inventors: John H. O'Dette; Stanton E. Jack, both of Kingston, Canada

[73] Assignee: Alcan Research and Development Limited, Montreal, Canada

[21] Appl. No.: 97,885

[22] Filed: Nov. 27, 1979

[30] Foreign Application Priority Data

Nov. 29, 1978 [GB] United Kingdom ............... 46516/78

[51] Int. Cl.$^3$ ................................................ C06B 45/34
[52] U.S. Cl. ............................................ 149/7; 149/6; 149/114
[58] Field of Search ................................ 149/6, 7, 114

[56] References Cited

U.S. PATENT DOCUMENTS

| | | | |
|---|---|---|---|
| 3,297,502 | 1/1967 | Chrisp | 149/6 |
| 3,919,013 | 11/1975 | Fox et al. | 149/6 |
| 4,256,521 | 3/1981 | Scherzinger | 149/6 |
| 4,274,894 | 6/1981 | McNeely | 149/7 |

FOREIGN PATENT DOCUMENTS 1193149  5/1970  United Kingdom ................... 149/6

Primary Examiner—Edward A. Miller
Attorney, Agent, or Firm—Cooper, Dunham, Clark, Griffin & Moran

[57] ABSTRACT

An improved water dispersible aluminum powder composition containing from 0.1% to less than 5% of a polyvinylpyrrolidone resin, and processes for its preparation are disclosed. This composition has the advantages that, in comparison to known compositions containing higher levels of polyvinylpyrrolidone, it can be more completely separated from hydrocarbons, and, when used as a water based slurry blasting agent sensitizer is effective in smaller diameter bore holes.

10 Claims, No Drawings

ALUMINUM POWDER BLASTING SLURRY SENSITIZER

BACKGROUND OF THE INVENTION (a) Field of the Invention

This invention relates to fine particle size aluminum powder. More particularly, this invention relates to a fine particle size aluminum powder composition suitable for use as a sensitizer in water-based slurry-type blasting agents.

Fine particle size aluminum powders, containing particles generally passing a 325 mesh Tyler sieve, and including particles having sizes down to a few microns, have many uses: in paints, inks, and similar coating compositions are well established ones, whilst a newer one is as a sensitizer in slurry-type blasting agents. But all uses for particulate aluminum wherein fine size particles are present involve a major disadvantage: micron size aluminum powder presents a serious hazard being prone to dust explosions. This very real hazard has limited, and still does limit, the commercial use of such aluminum powders, especially if the operation in question can involve the presence, at some stage, of a dry aluminum powder.

For a number of uses, these problems can either be sufficiently mitigated, or indeed overcome, by ensuring that the powder is fully coated at all times with an organic liquid (this is commonly called a "wetted down" condition). It is to be noted that, generally speaking, water is not a suitable wetting down liquid, since fine powder aluminum reacts spontaneously with water to release hydrogen gas—this property is utilized in some uses for such powders, for example in preparing blown cements and concretes. Generally the wetting down liquid used is a hydrocarbon material, such as kerosene, or mineral spirits (a hydrocarbon material having a boiling point of about 150° C.–190° C.).

Whilst these wetted down systems are far less hazardous than a dry aluminum powder, they are not a complete solution to all of the handling problems, for two separate reasons. The first is that to an extent one problem is replaced by another: a dust explosion hazard is replaced by a flammability hazard. The second is that very often the presence of the hydrocarbon liquid used to wet down the powder cannot be tolerated, since it leads to complications in the end use contemplated. This difficulty becomes acute in water-based systems which contain little, or no, organic solvents. Representative aqueous systems in which the presence of even minimal amounts of hydrocarbons is undesirable are cement and concrete foaming systems, and water-based slurry type blasting agents.

Aluminum powder used to sensitize water-based slurry blasting agents must meet two requirements. First, the powder must be active enough to function as a blasting agent sensitizer, preferably without the assistance of a booster such as TNT or PETN: that is, it is desirable that the sensitized blasting agent slurry be cap-sensitive. Second, the aluminum powder used as the sensitizer must not be so reactive that it reacts with the water present in the slurry. In an extreme case, such reaction can result in total loss, by dissolution, of the sensitizing powder. In an intermediate case, such reaction both generates gas bubbles in the slurry, and also encrusts the particles of aluminum with an oxide layer. Both of these are conditions that can have dangerous consequences. If the sensitizer is lost, the placed slurry (e.g. in a bore hole in an open pit mine or quarry) will not detonate at all. If large gas bubbles and/or a heavily oxidised sensitizer are present then such a placed slurry may go "dead" and either will not explode at all, or will not detonate properly.

Thus for blasting agent sensitizer use, a fine particle size aluminum powder is required which is non-dusting, is non-reactive to water, is relatively free of hydrocarbon and which is reactive enough to promote detonation, preferably through being cap-sensitive. Against these desiderata has to be set the fact that the industrially most convenient process for preparing fine particle size aluminum, of a size suitable for use as a sensitizer, is to comminute aluminum in a hydrocarbon medium such as kerosene or white spirits.

(b) Description of the Prior Art

It has been proposed to overcome these problems, and thereby provide an aluminum powder composition capable of functioning adequately as a sensitizer in a water-based slurry type explosive, by ball milling the aluminum in a hydrocarbon medium and in the presence of a polyvinylpyrrolidone resin. The hydrocarbon used as the grinding medium can then be displaced by contacting the wetted down composition with a liquid which is either a solvent for, or will swell, the polyvinylpyrrolidone resins. Suitable liquids for this purpose are water, ethanol, ethylene glycol, diethylene glycol and formamide. By this procedure an aluminum composition fully capable of acting as a sensitizer in a water-based slurry type blasting agent is obtained. These compositions are effective in bore holes down to 3" in diameter. Such compositions contain from 5% to 20% by weight of polyvinylpyrrolidone, based on the weight of aluminum powder present in the composition. A preferred range of polyvinylpyrrolidone resin is from 10% to 15%.

However these compositions generally containing 10% to 15% of polyvinylpyrrolidone, have been found to have a disadvantage. It has been found in practice that, even when an organic solvent is used, rather than water, in the displacement step, adequate separation of the aluminum powder/polyvinylpyrrolidone composition from the hydrocarbon liquid used in the grinding step is difficult. In practice it has been found that at least 10% of the hydrocarbon is always left in the composition, which complicates its proper incorporation into a slurry.

SUMMARY OF THE INVENTION

We have now discovered that this disadvantage can be overcome by decreasing the amount of polyvinylpyrrolidone to amounts far less than the 5% lower limit earlier proposed. Indeed if a level of about 1% is used, which is one tenth of that preferred in the earlier compositions, then quite surprisingly a sensitizer is obtained which, in addition to the advantages shown by the earlier systems, is both cap-sensitive and will fire adequately in smaller holes, at least down to 1½" diameter. Indeed the lower limit appears to be at about 0.1% polyvinylpyrrolidone, by weight based on the weight of aluminum present, at which point the compositions begin to present an undesirable dust hazard after removal of the hydrocarbon.

DESCRIPTION OF THE PREFERRED EMBODIMENTS

Thus in a first aspect this invention provides a process for preparing a water dispersable aluminum powder composition which comprises comminuting a particulate aluminum feed in a hydrocarbon medium, and in the presence of from about 0.1% to less than 5% by weight, based on the weight of aluminum present, of a polyvinylpyrrolidone resin powder, until a desired aluminum particle size is reached, and thereafter removing the majority of the hydrocarbon medium to provide an aluminum paste composition containing 15% to 30% by weight of hydrocarbon medium.

Conveniently, the weight ratio of hydrocarbon medium to aluminum present for the comminuting step is about 2:1. Suitable hydrocarbons are the usual distillate fractions sold under various names, such as mineral spirits, white spirit, and kerosene. The kerosene types are preferred as they generally have a higher flash point.

Preferably, not less than 0.25% of polyvinylpyrrolidone, based on the weight of aluminum present, is used because even though an adequate sensitizer can be obtained at a level as low as about 0.1%, at levels below 0.25% there is some tendency for the aluminum powder particles to agglomerate or weld together during the grinding. Also, at levels of about 0.1% a tendency to form free dust in the filter cake becomes apparent which is highly undesirable as this dust presents an explosion hazard. A level of about 1%, that is in the range 0.5% to 1.5%, is preferred, since at this level optimum properties appear to be obtained.

Typically, the particle size of the aluminum in the finished product is such that 90% thereof will pass a 325 mesh Tyler sieve, the particles having a size range of generally from 2 microns to 10 microns.

Preferably the finished paste contains as little hydrocarbon medium as possible. Generally speaking, removal of the hydrocarbon medium by normal physical separation techniques should provide an aluminum paste composition containing from 15% to 30% of hydrocarbon medium.

The aluminum taken to prepare the powder can be any suitably small aluminum material, for example air-blown powder or chopped foil. The aluminum used also need not be pure; both aluminum and its alloys can be used. However, it is desirable to avoid alloys which contain elements known to be deleterious when used in blasting agents: for example, alloys containing significant amounts of copper and zinc have been found to impair the detonation velocity when used as a fuel in an ammonium nitrate/fuel oil slurry blasting agent.

Any suitable means of comminution may be used to obtain the powder. A simple ball-mill is eminently satisfactory.

In a second aspect this invention provides a substantially non-dusting fine particle size aluminum powder composition containing, based on the weight of aluminum present, from 0.1% to less than 5% of a polyvinylpyrrolidone resin and from 15% to 30% of a hydrocarbon liquid medium.

For many purposes it is desirable to be able to remove the hydrocarbon medium from the aluminum powder. A major disadvantage of the earlier proposed compositions containing, usually, about 10% to 15% of polyvinylpyrrolidone resin, is that at least about 10% of the hydrocarbon present in the paste is left behind when it is displaced. With the lower levels of polyvinylpyrrolidone used in this invention, it has been found that both far more of the hydrocarbon medium can be removed, and also less of the displacing medium is needed. In the earlier process, about 30% by weight of organic solvent, based on the weight of aluminum present, is used. This corresponds to 60% to 100% by weight of organic solvent based on the weight of hydrocarbon medium present, since the pastes contain from 30% to 50% by weight hydrocarbon based on the weight of aluminum. We have now found that with the lower levels of polyvinylpyrrolidone resin of this invention, from 20% to 50% by weight of organic solvent, based on the weight of hydrocarbon medium present, is effective to remove the hydrocarbon medium, and, further that more than 97% of the hydrocarbon medium can be removed (i.e. from a paste containing 30% by weight hydrocarbon, based on the weight of aluminum, less than 1% hydrocarbon will be left remaining in the system). This level of efficiency of hydrocarbon removal is wholly unexpected since polyvinylpyrrolidone is a water soluble hydrophilic polymer. It also appears that simple displacement of the hydrocarbon by kneading the paste with water is more efficient at the lower levels of polyvinylpyrrolidone of this invention.

Thus in a third aspect this invention provides a process for preparing a substantially non-dusting fine particle size water dispersible aluminum powder composition containing less than about 1% by weight of hydrocarbon, based on the weight of aluminum present, which process comprises comminuting a particulate aluminum feed in a hydrocarbon medium, and in the presence of 0.1% to less than 5% by weight of the aluminum present of a polyvinylpyrrolidone resin powder until a desired particle size is reached; separating excess hydrocarbon medium to provide a paste containing from about 15% to about 30% of hydrocarbon medium; displacing the hydrocarbon medium from the composition by blending therewith from about 20% to about 50% by weight, based on the weight of hydrocarbon medium present, of water or a polar organic solvent for polyvinylpyrrolidone, and thereafter separating from the aluminum composition the displaced hydrocarbon medium.

And in a fourth aspect this invention comprises a substantially non-dusting fine particle size water dispersible aluminum powder composition containing, based on the weight of aluminum present, from 0.1% to less than 5% of a polyvinylpyrrolidone resin, and from about 3% to about 15% by weight of water or of a polar organic solvent for polyvinylpyrrolidone, for example ethyl alcohol, diethylene glycol, ethylene glycol, or formamide. Preferably the polar organic solvent is ethylene glycol, diethylene glycol or formamide, of which ethylene glycol is the solvent of choice.

The aluminum powder compositions of this invention, in common with the earlier proposed compositions containing higher levels of polyvinylpyrrolidone, are particularly suitable for use in slurry-type water-containing blasting agents. In common with these earlier compositions, they exhibit a desirable level of stability toward the aqueous milieu in which they are used. In contrast to these earlier systems, they exhibit three further advantages, of which their capability for almost total hydrocarbon removal is the most useful from a practical viewpoint. They also will fire satisfactorily in smaller diameter bore holes, for example, successful firings have been made at 1½" (3.8 cm. approx.), and also exhibit cap-sensitivity when used in a typical blasting agent, such as the following (in parts by weight):

| | | | |
|---|---|---|---|
| Ammonium Nitrate | 43 | Water | 19 |
| Sodium Nitrate | 16 | Surfactant | 2.5 |
| Sulphur (optional) | 3 | Sodium Tartrate | 0.02 |
| Sodium Dichromate | 0.06 | Gums | 1.0 |
| Solvent | 4 to 8 | | |

To such a slurry from 1% to 10% of aluminum sensitizer composition is added, preferably containing about 1% of polyvinylpyrrolidone, based on the aluminum present. Such a system is cap-sensitive to detonation in a 1½″ diameter hole using a standard high energy blasting cap.

In the foregoing description it is implied that the compositions of this invention contain only aluminum powder, polyvinylpyrrolidone resin, some hydrocarbon, and some polar organic solvent, depending upon whether the additional process step of removing the major part of the hydrocarbon had been utilized. These compositions should not be viewed in such a limiting fashion, since they may contain other materials, generally in small quantities, which are included usually to improve their handling properties. Such materials are well known in the art, and include, for example, surfactants to aid dispersion of the composition of this invention into a water based slurry blasting agent.

We claim:

1. A process for preparing a water dispersable aluminum powder composition which comprises comminuting a particulate aluminum feed in a hydrocarbon medium and in the presence of from 0.5% to 1.5% by weight, based on the weight of the aluminum present, of a polyvinylpyrrolidone resin powder, until a desired aluminum particle size is reached, and thereafter removing the majority of the hydrocarbon medium to provide an aluminum paste composition containing 15% to 30% by weight of hydrocarbon medium.

2. A process for preparing a substantially non-dusting fine particle size water dispersible aluminum powder composition essentially containing less than about 1% by weight of hydrocarbon, based on the weight of aluminum present, which process comprises comminuting a particulate aluminum feed in a hydrocarbon medium, and in the presence of 0.5% to 1.5% by weight of the aluminum present of a polyvinylpyrrolidone resin powder until a desired particle size is reached; separating excess hydrocarbon medium to provide a paste containing from about 15% to about 30% of hydrocarbon medium; displacing the hydrocarbon medium by blending therewith from about 20% to about 50% by weight, based on the weight of hydrocarbon medium present, of water or a polar organic solvent for polyvinylpyrrolidone, and thereafter separating from the aluminum composition the displaced hydrocarbon medium.

3. Process according to claims 1 or 2 wherein the weight ratio of hydrocarbon medium to aluminum present from the comminuting step is about 2:1.

4. Process according to claims 1 or 2 wherein about 1% by weight, based on the weight of aluminum present, of polyvinylpyrrolidone resin powder is used.

5. Process according to claims 1 or 2 wherein the aluminum is comminuted to a particle size such that 90% thereof will pass a 325 mesh Tyler seive.

6. Process according to claims 1 or 2 wherein the aluminum is comminuted to a particle size such that 90% thereof have a size range of generally from 2 microns to 10 microns.

7. Process according to claims 1 or 2 wherein the particulate aluminum feed comprises aluminum and alloys thereof.

8. Process according to claim 2 wherein the polar organic solvent is chosen from ethyl alcohol, diethylene glycol, ethylene glycol, and formamide.

9. Process according to claim 2 wherein the polar organic solvent is chosen from ethylene glycol, diethylene glycol, and formamide.

10. Process according to claim 2, wherein the polar organic solvent is ethylene glycol.

* * * * *